United States Patent
Mann et al.

(10) Patent No.: US 8,200,931 B2
(45) Date of Patent: *Jun. 12, 2012

(54) MEMORY CARD WITH EMBEDDED IDENTIFIER

(75) Inventors: Joseph Francis Mann, Waukesha, WI (US); William N. Schroeder, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/150,793

(22) Filed: Jun. 1, 2011

(65) Prior Publication Data

US 2011/0231939 A1    Sep. 22, 2011

Related U.S. Application Data

(63) Continuation of application No. 11/465,951, filed on Aug. 21, 2006, now Pat. No. 7,971,017.

(51) Int. Cl.
    *G06F 12/00* (2006.01)
(52) U.S. Cl. ............ 711/163; 711/164; 705/51; 705/57; 726/26; 726/27; 726/31; 726/32
(58) Field of Classification Search .......................... None
    See application file for complete search history.

(56) References Cited

U.S. PATENT DOCUMENTS

| | | |
|---|---|---|
| 6,199,114 B1 | 3/2001 | White |
| 6,615,324 B1 | 9/2003 | Fermald |
| 6,834,333 B2 | 12/2004 | Yoshino et al. |
| 6,885,607 B2 | 4/2005 | Ozawa |
| 7,234,061 B1 | 6/2007 | Diab et al. |
| 2005/0283610 A1 | 12/2005 | Serret-Avila et al. |
| 2006/0118640 A1 | 6/2006 | Yu et al. |
| 2006/0129819 A1 | 6/2006 | Hirota et al. |
| 2006/0161750 A1 | 7/2006 | Perkins et al. |
| 2007/0143632 A1 | 6/2007 | Matsuzaki et al. |

OTHER PUBLICATIONS

OA dated Jul. 9, 2008 for U.S. Appl. No. 11/465,951, 20 pages.
OA dated Jan. 22, 2009 for U.S. Appl. No. 11/465,951, 17 pages.
OA dated Jul. 9, 2009 for U.S. Appl. No. 11/465,951, 17 pages.
OA dated Aug. 2, 2010 for U.S. Appl. No. 11/465,951, 24 pages.
OA dated May 14, 2010 for U.S. Appl. No. 11/465,951, 20 pages.
Notice of Allowance dated Feb. 23, 2011 for U.S. Appl. No. 11/465,951, 21 pages.

*Primary Examiner* — Reginald Bragdon
*Assistant Examiner* — Baboucarr Faal
(74) *Attorney, Agent, or Firm* — Turocy & Watson, LLP; Alexander R. Kuszewski; John M. Miller

(57) ABSTRACT

A software installation system comprises an interface component that receives a request to access data resident upon a flash memory card. An installation component compares a unique identifier associated with the data with a unique identifier embedded within the flash memory card, and the installation component determines whether to allow access to the data based at least in part upon the comparison. The installation component prohibits access to the data if the unique identifier associated with the data does not match the unique identifier embedded within the flash memory card.

19 Claims, 11 Drawing Sheets

MEMORY CARD WITH EMBEDDED IDENTIFIER

PRIORITY CLAIM

This application claims priority to U.S. patent application Ser. No. 11/465,951, filed on Aug. 21, 2006, entitled "MEMORY CARD WITH EMBEDDED IDENTIFIER." The entirety of the aforementioned application is incorporated by reference herein.

TECHNICAL FIELD

The claimed subject matter relates generally to industrial environments and, more particularly, to preventing piracy of data.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, activities that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases (or web services referencing databases) that are accessible by system/process/project managers on a factory floor. For example, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

As in other industries that rely on sale of software or data, or in industries that uncontrolled replication of data is undesirable (such as the music industry), piracy is of great concern to industrial environments. Pursuant to an example, the music industry claims to have lost billions of dollars in revenue due to piracy associated with digital music. Similarly, companies that specialize in sale of software have suffered significant loss of potential revenue due to piracy of such software.

To combat such piracy, digital rights management (DRM) systems have become prevalent, wherein rules are programmatically embedded within digital files and a DRM system is utilized to enforce such rules. For instance, a music file may only be playable on a portable media device for a certain amount of time before the user is required to synchronize the portable media device with a personal computer to renew a license. In another example, software keys and registration of software have been utilized in an attempt to mitigate piracy of certain software. Additionally, hardware dongles can be utilized, wherein software runs in a restricted mode or does not run at all unless the dongle is communicatively coupled to a computing device. These dongles can frustrate a user, however, as each time software is desirably run the dongle must be present. Additionally, the dongles are typically fairly small in size, making them easy to lose. Thus, a valid user may not be able to utilize legally purchased software due to loss of a hardware dongle.

SUMMARY

The following presents a simplified summary of the disclosed subject matter in order to provide a basic understanding of some aspects described herein. This summary is not an extensive overview, and is not intended to identify key/critical elements or to delineate the scope of the disclosed subject matter. Its sole purpose is to present some concepts in a simplified form as a prelude to the more detailed description that is presented later.

A flash memory card is described herein, wherein the flash memory card includes a unique identifier that is embedded within hardware of the flash memory card. Pursuant to an example, the unique identifier can be a serial number of the flash memory card; however, any suitable unique identifier can be utilized. The flash memory card can also include flash memory that retains data, which can include data files (such as music files, word processing documents, etc.), software applications, executables utilized to install software applications on a computing device, and/or the like. Through utilization of the unique identifier that is permanently embedded within the flash memory card, data can be tied to such flash memory card. In other words, widespread dissemination of sensitive and/or proprietary data can be prevented.

To tie data to flash memory card, the unique identifier can be associated with data that is stored on the flash memory card. More particularly, when data is desirably transferred to a flash memory card, such card can be analyzed to determine a unique identifier that is embedded within hardware of the card. Once the unique identifier is determined, such identifier (or a variant thereof) can be associated with the data that is desirably transitioned to the flash memory card. For instance, an encrypted version of the unique identifier can be placed within a header associated with data desirably transitioned to the flash memory card. Moreover, security keys, rules for access (such as who is allowed to access the data, time window of access, and the like) can be placed upon the flash memory card.

When such data is later desirably accessed, the unique identifier that is permanently embedded within hardware of the flash memory card can be compared with a unique identifier associated with the data residing within flash memory. If the unique identifiers correspond, then access to the data can be granted. In a particular example, a flash memory card can be configured to retain a software application that can be installed on one or more computers. To enable installation of the software, a unique identifier embedded within the hardware of the flash memory must correspond to a unique identifier associated with the software. If the software is copied to other devices (in an attempt of piracy), such software will not install as unique identifiers will not correspond (e.g., since the software does not reside upon the flash memory card, it will not be possible to install such software).

To the accomplishment of the foregoing and related ends, certain illustrative aspects of the disclosed subject matter are described herein in connection with the following description and the annexed drawings. These aspects are indicative, however, of but a few of the various ways in which the principles of the described subject matter can be employed and such subject matter is intended to include all such aspects and their equivalents. Other advantages and novel features will become

DETAILED DESCRIPTION

Figure 1:
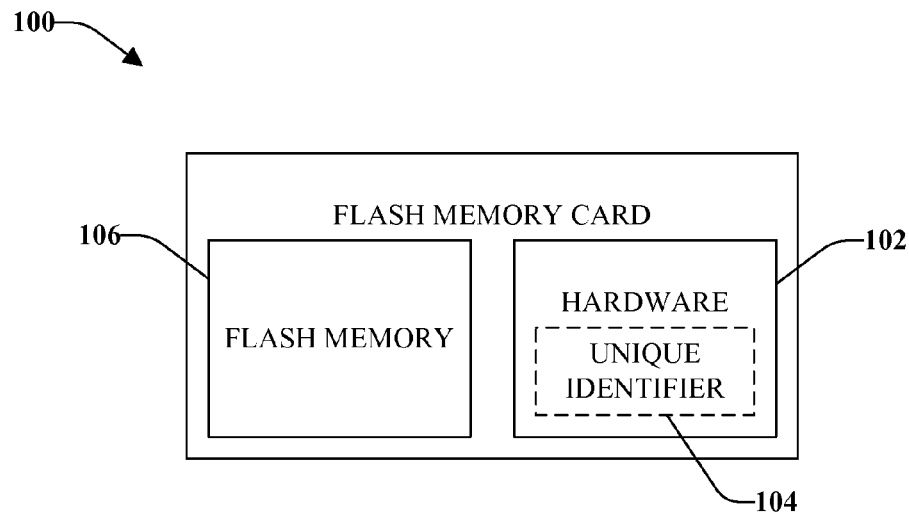
FIG. 1 illustrates a flash memory card with a unique identifier permanently embedded therein.

The subject invention is now described with reference to the drawings, wherein like reference numerals are used to refer to like elements throughout. In the following description, for purposes of explanation, numerous specific details are set forth in order to provide a thorough understanding of that described herein. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a flash memory card 100 that can be utilized in connection with reducing software/data piracy. More particularly, the flash memory card 100 can be used in connection with storing data and/or software and prohibiting installation of software on a computing device or transmittal of desirably protected data to a computing device. More particularly, the flash memory card 100 can include hardware 102, wherein a unique identifier 104 is permanently persisted within such hardware 102. Thus, the unique identifier 104 cannot be programmatically altered. For instance, the unique identifier 104 can be hardwired such that it cannot be altered unless the flash memory card 100 is destroyed.

The flash memory card 100 can also include flash memory 106, which can include at least one flash memory cell. Today's flash memory cards are capable of retaining a significant amount of data (e.g., several gigabytes of data). The flash memory 106 can be utilized to retain data and/or software applications that may be desirably transferred to a computing device that can interface with the flash memory card 100 and/or installed on such computing device. For example, a software application can reside within the flash memory 106, wherein an operator may desire to install the software application on a computing device that is coupled to the flash memory card 100.

The flash memory card 100 can be utilized to reduce occurrences of piracy with respect to data (including software). More particularly, data placed within the flash memory 106 can be associated with a unique identifier that corresponds to the unique identifier 104 that is persisted within the hardware 102. For example, the unique identifier associated with the data can be identical to the unique identifier 104, can be a hash of the unique identifier 104 or other encryption of the unique identifier 104, and/or the like. When the data within the flash memory 106 is desirably reviewed or transferred from the flash memory card 100 to memory associated with a computing device (not shown), the unique identifier associated with the data within the flash memory 106 can be compared with the unique identifier 104 that is persisted within the hardware 102. If the unique identifiers do not correspond, then data can be prohibited from being transferred from the flash memory card 100.

In another example, the unique identifier 104 embedded within the hardware 102 can act as a security key, such that software cannot be installed unless the flash memory card 100 is coupled to a device that desires to install the software. More particularly, software in the flash memory 106 can be copied onto a storage medium associated with a computing device. Thereafter, such software can be disseminated to various computing devices through a network connection, such as the Internet. The disseminated software will be useless, however, as installation can be prevented if the unique identifier 104 within the hardware 102 is not accessible. This concept can additionally be employed with respect to data files. For example, a music file that is disseminated may be prohibited from being played unless the unique identifier 104 is communicatively coupled to a device that desires to play the music file.

Figure 2:
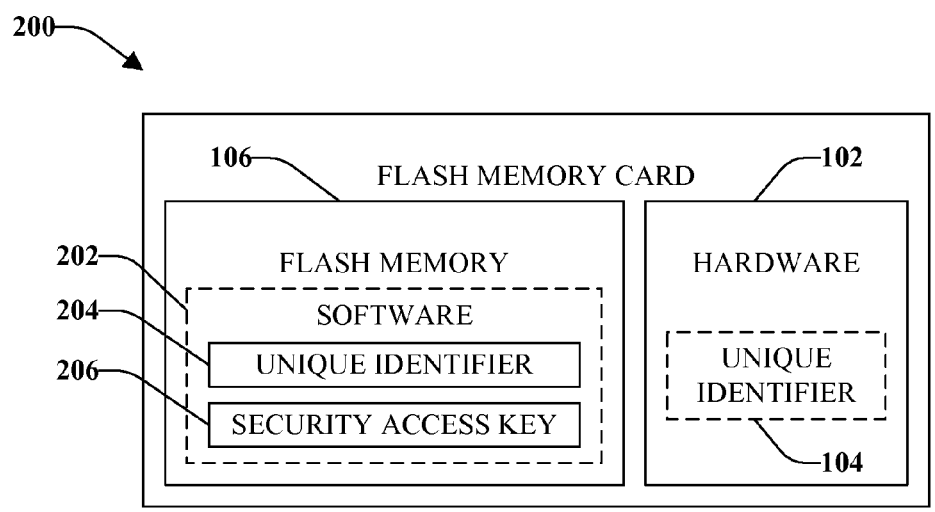
FIG. 2 illustrates a flash memory card with a unique identifier permanently embedded therein.

Now referring to FIG. 2, the flash memory card 100 is illustrated, wherein the flash memory card 100 can be utilized to mitigate occurrences of illegal data replication (piracy). For example, the flash memory card 100 can be a portable memory card, such as a card that is configured to interact with a computing device by way of a Universal Serial Bus (USB). The flash memory card 200 includes the hardware 102 with the unique identifier 104 persisted therein, such that the unique identifier 104 cannot be programmatically altered. In an example, the unique identifier 104 can be a serial number of the flash memory card 100. The flash memory card 100 can also include flash memory 106, which comprises at least one flash memory cell. It is understood, however, that the flash memory 106 can include numerous memory cells, such that the flash memory 106 can have storage capacity in the order of several gigabytes. Additionally, the flash memory 106 can be NOR or NAND flash memory.

The flash memory 106 can include software 202, wherein such software can be installed on a computing device, such as a personal computer, a laptop computer, a server, and/or the like. Additionally, the software 202 can be desirably installed on a portable computing device, including a portable digital camera, a combined controller/HMI, or other suitable device that can be interfaced with the flash memory card 100. The software 202 is associated with a unique identifier 204, wherein the unique identifier 204 corresponds to the unique identifier 104 that is persisted within the hardware 102. For instance, the unique identifier 204 can be a hash of the unique identifier 104, an encrypted version of the unique identifier 104, identical to the unique identifier 104, etc. Widespread piracy of the software 202 can be thwarted through use of the corresponding unique identifiers 104 and 204. For example, the flash memory card 100 can be associated with a computing device and a user of the computing device can review content of the flash memory card 100 (or an installation procedure can be automatically initiated). The computing device can analyze the unique identifier 204 (e.g., decrypt the unique identifier 204, utilize a hash algorithm against the unique identifier) and compare the unique identifier 204 with the unique identifier 104 persisted within the hardware 102. If the unique identifiers 104 and 204 do not compare favorably, then installation can be prohibited. In other words, an individual is not able to illegally download software, place such software upon a different flash memory card, and thereafter install the software (as the unique identifier 104 would not correspond to a unique identifier persisted within the flash memory card).

For further security, the software 202 can include a security access key 206 and/or be forced to register the software once installed. Thus, an individual desirably installing the software 202 upon a computing device would need to have access to the security access key 206 to complete installation. Other forms of security are also contemplated by the inventors, including but not limited to requesting usernames, passwords, personal identification numbers, biometric indicia (such as a fingerprint scan), and/or the like. Additionally, while described in connection with software installation, it can be discerned that the concepts described above can be applied to data in general. For instance, transfer of data from the flash memory card 100 can be restricted and/or access to data within the flash memory card 100 can be restricted through analysis of the unique identifiers 104 and 204.

Figure 3:
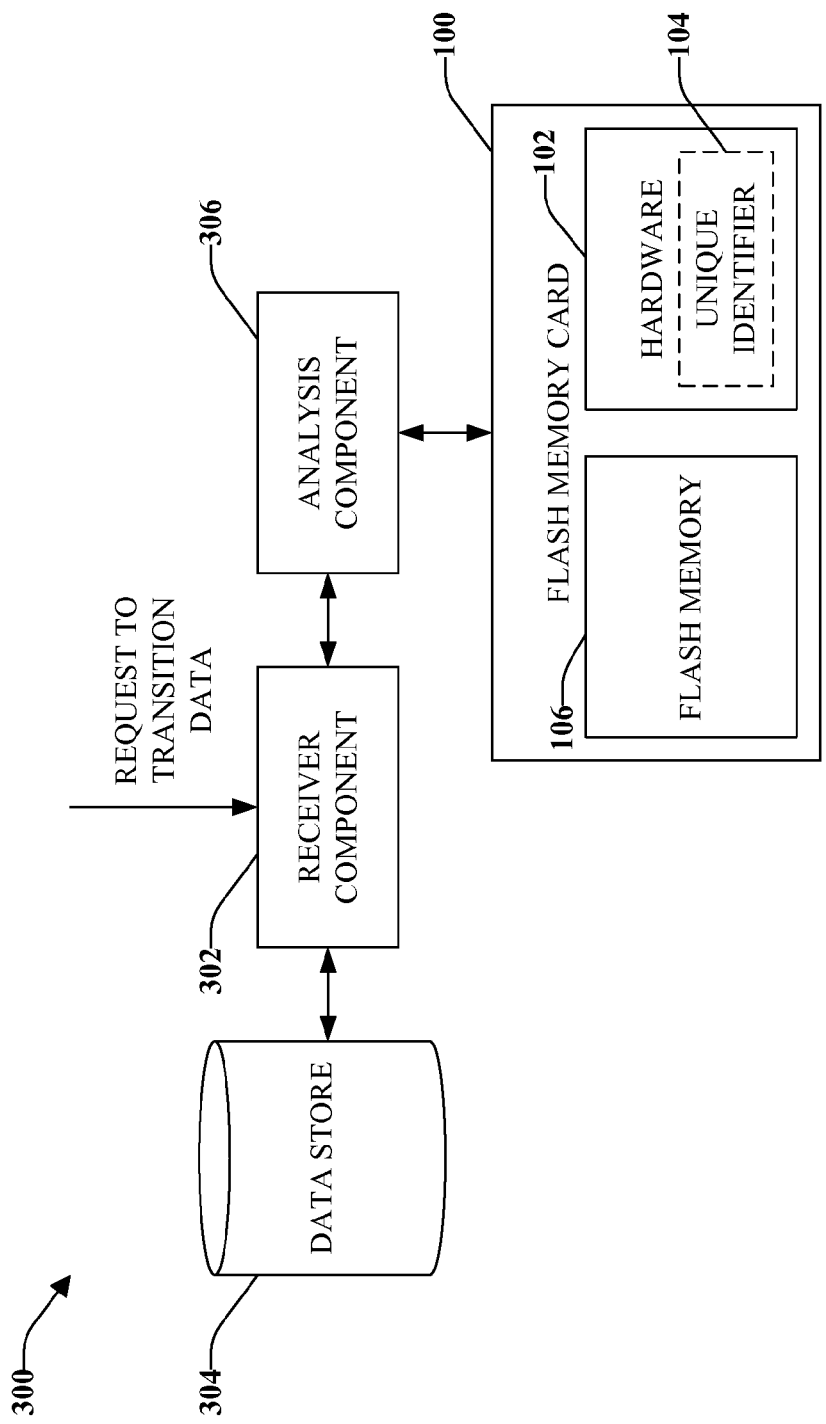
FIG. 3 illustrates a system for transitioning data onto a flash memory card, wherein the data is desirably tied to the flash memory card.

Turning now to FIG. 3, a system 300 that facilitates transitioning data to the flash memory card 100 is illustrated. For instance, the system 300 can be utilized by companies that are selling software or data files, wherein the companies wish to have some sort of control over the dissemination of the software or data files. In another example, the system 300 can be employed by consumers who wish to prevent data stored upon the flash memory card 100 from being widely distributed (such as by way of the Internet). Thus, the system 300 can be utilized to protect data that is proprietary with respect to large companies or individual consumers.

The system 300 includes a receiver component 302 that receives a request to transition data from a data store 304 to the flash memory card 100. For example, the request can be for transitioning software to the flash memory card 100, raw data to the flash memory card 100, and/or the like. An analysis component 306 can receive the request and access the flash memory card 100 to review/determine the unique identifier 104 that is permanently persisted in the hardware 102 of the flash memory card 100. The analysis component 306 can then associate the unique identifier 104 or a variant thereof with the data or software that is desirably retained upon the flash memory card 100. Thereafter, the analysis component 306 can cause the desirably transferred data to be retained within the flash memory 106 as well as a unique identifier that corresponds to the unique identifier 104. Thus, data (including software) is tied to the actual flash memory card 100, thereby rending duplication of data outside the flash memory card 100 useless. In other words, software can't be installed and/or data cannot be transferred/viewed unless the flash memory card 100 is retaining the data within the flash memory 106 (e.g., software copied from the flash memory card 100 cannot be installed on another computing device).

Figure 4:
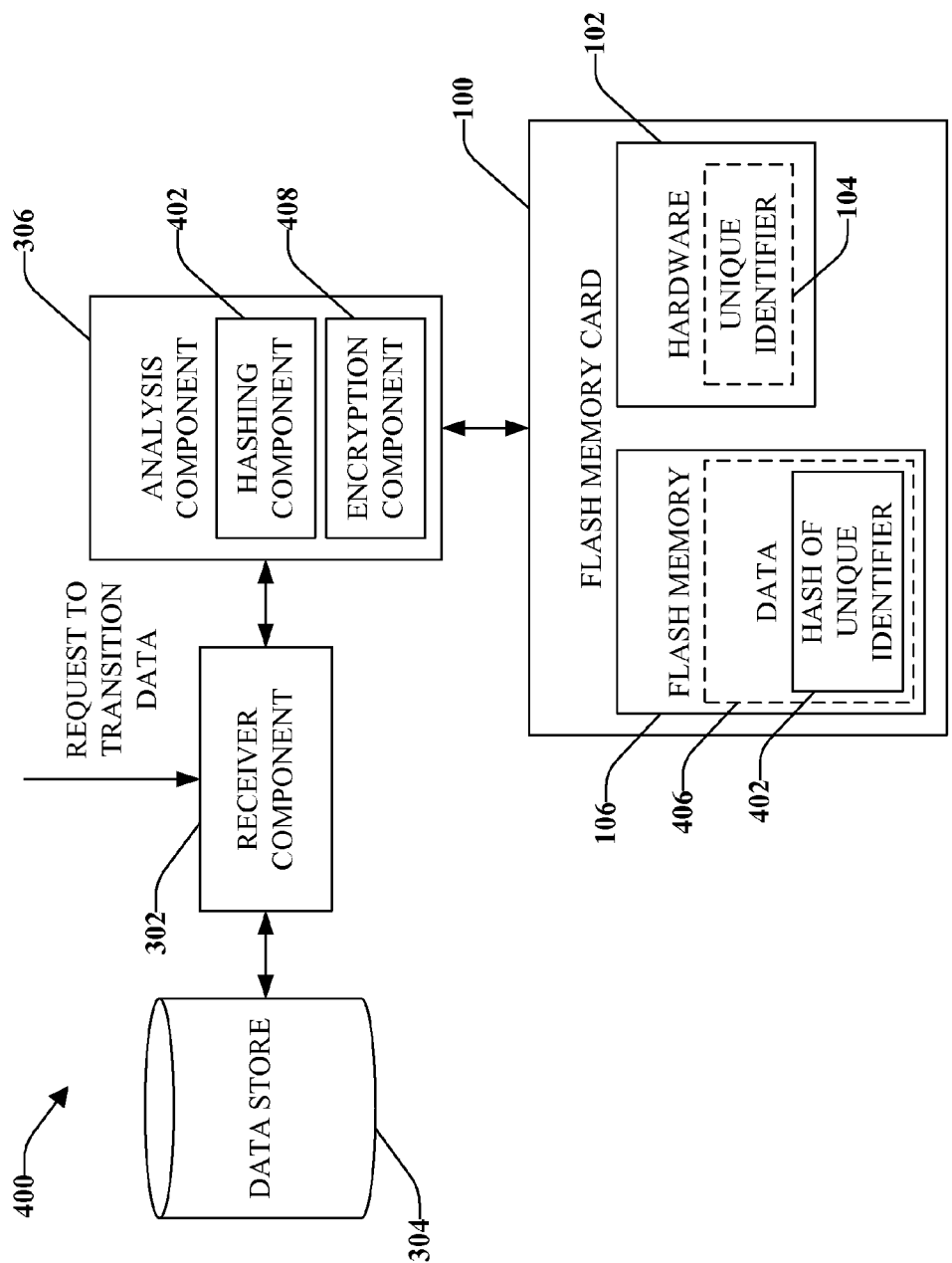
FIG. 4 illustrates system for transitioning data onto a flash memory card, wherein the data is desirably tied to the flash memory card.

Referring now to FIG. 4, a system 400 that facilitates transitioning sensitive data to a flash memory card and tying such data to the flash memory card is illustrated. The system 400 includes the receiver component 302 that receives a request to transition certain data from a data store 304, wherein the data that is the subject of the request is desirably tied to the flash memory card 100. Thus, in other words, it is desirable to prohibit uncontrolled, widespread dissemination of the data that is the subject of the request (e.g., by way of the Internet).

The analysis component 306 can receive the data that is the subject of the request, determine the unique identifier 104 within the hardware 102 of the flash memory card 100, and associate the data that is the subject of the request with a unique identifier that corresponds to the unique identifier 104 within the hardware 102 of the flash memory card 100. For instance, the analysis component 306 can associate an exact copy of the unique identifier 104 with data that is subject to the request. In another example, the analysis component 306 can be associated with a hashing component 402 that can generate a hash 404 of the unique identifier 104. In more detail, the analysis component 306 can store data 406 that is the subject of the request within the flash memory 106 of the memory card 100. The analysis component 306 can also determine the unique identifier 104, and the hashing component 402 can utilize any suitable hash algorithms in connection with creating a hash of the unique identifier, and can associate such hash of the unique identifier 404 with the data 406. While not shown, the hash algorithm itself can be stored within the flash memory 106 along with one or more keys. Thus, when an individual attempts to access/install/execute the data 406 within the flash memory 106, the hash of the unique identifier 404 can be subjected to the hash algorithm and compared to the unique identifier 104 embedded within the hardware 102; if the unique identifier 104 does not correspond to the hash of the unique identifier 404, then access to the data 406 is prohibited. Therefore, if an individual copies the data 406 to another source, the data 406 will not be able to be opened, installed, and/or accessed, as the unique identifier 104 is not present.

The analysis component 306 can also include an encryption component 408 that can encrypt the data 406 and/or a unique identifier that is associated with the data 406 (which corresponds to the unique identifier 104). Encryption keys can be retained within the flash memory card 100, which further ties the data 406 therein to the flash memory card 100 (and prohibits use of such data outside the card 100). Thus, the data 406 may only be accessible if it resides within an appropriate flash memory card and if the flash memory card 100 includes the encryption keys associated with the data 406 and/or a unique identifier (or variant thereof) that is associated with the data 406 (which corresponds to the unique identifier 104).

Figure 5:
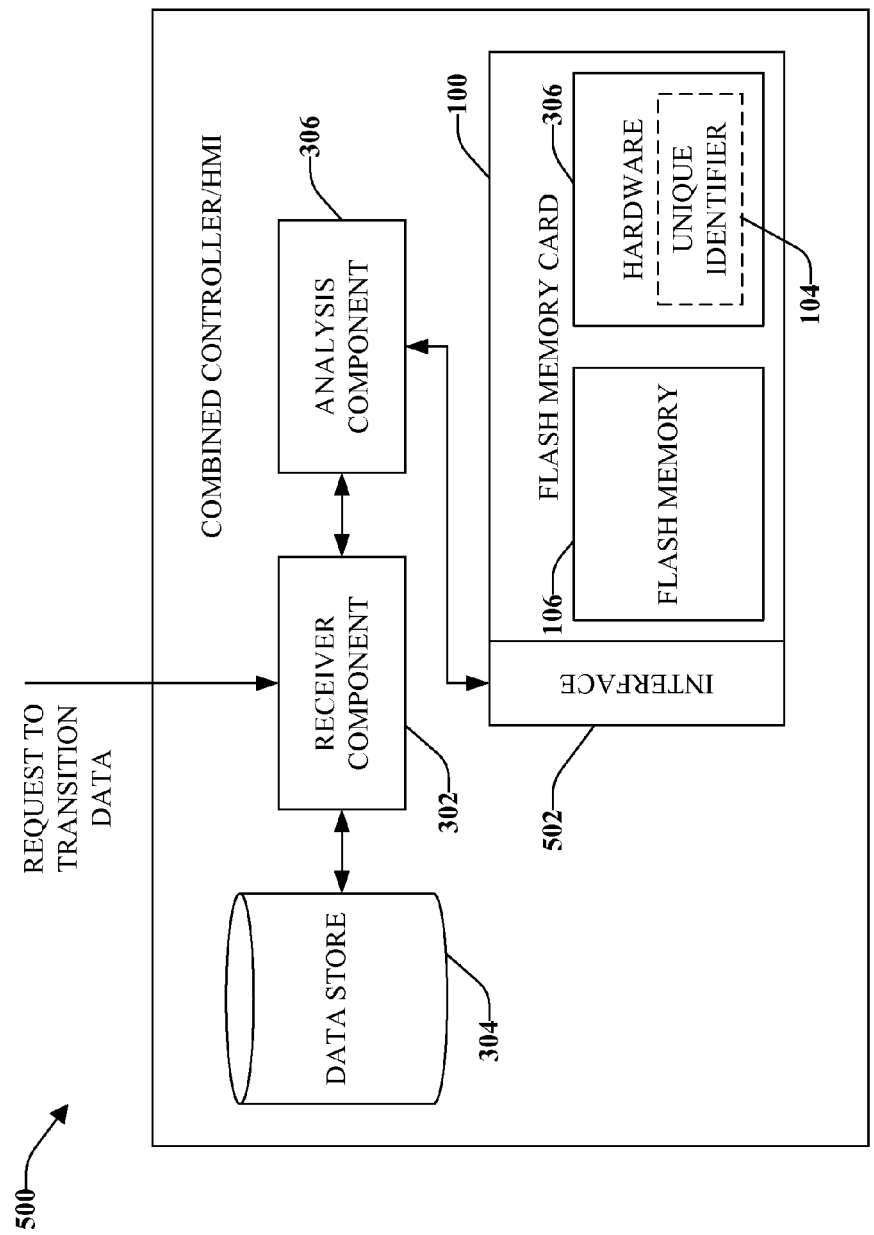
FIG. 5 illustrates a combined controller/human-machine interface that can transition data to a flash memory card.

Now turning to FIG. 5, a combined controller/HMI (CHMI) 500 is illustrated. The CHMI 500 includes an interface 502 that enables the flash memory card 100 to be communicatively coupled to memory and/or a processor (not shown) of the CHMI 500. For example, the flash memory card 100 can be a USB memory card, and the interface 502 can be a USB port and/or software associated therewith. Additionally or alternatively, the flash memory card 100 can conform to a proprietary format, and the interface 502 can be designed to enable the CHMI to be coupled to the flash memory card 100.

Once the flash memory card 100 is coupled to the CHMI 500 by way of the interface 502, the receiver component 302 can receive a request to transfer data from the data store 304 associated with the CHMI 500 into the flash memory card 100. The data can be, for instance, an executable file, all or portions of software, and/or other sensitive/proprietary data. While shown as being internal to the CHMI 500, it is understood that the data store 304 can be external to the CHMI 500 and communicatively coupled thereto by an interface (not shown). Moreover, the data store 304 can include volatile and/or nonvolatile memory, can be another memory card, can be a hard disk drive, and/or the like.

Prior to placing the data that is the subject of the request onto the flash memory card, the analysis component 306 can access the flash memory card 100 and determine the unique identifier 104 that is permanently persisted within the hardware 102 of the card 100. The analysis component 306 can then associate the data that is the subject of the request with a unique identifier that corresponds to the unique identifier 104. For example, the analysis component 306 can associate the data that is the subject of the request with a copy of the unique identifier 104, a hash of the unique identifier 104, etc. The analysis component 306 can then be employed to store the data from the data store 304 and the associated unique identifier within the flash memory 106 of the flash memory card 100 by way of the interface 502.

The analysis component 306 can also be utilized to store other rules associated with the data on the flash memory 106. For instance, it may be desirable to limit access to the data to a specified period of time (e.g., two days), at which time the data is no longer accessible by way of the flash memory card 100. In another example, it may be desirable to restrict who has access to the data retained within the flash memory 106 (once the flash memory card 100 is removed from the combined controller/HMI). Accordingly, the analysis component 306 can be utilized to store access restrictions on the flash memory card 102 (wherein such restrictions are provided by an individual or software). For instance, it may be desirable to allow employees of a company to access the data but not allow individuals outside the company to access the data (e.g., if the flash memory card 100 is lost or misplaced). This can be enforced through authenticating an individual's identity through a username, password, personal identification number, biometric indicia, security questions, location, and/or the like.

As can be perceived from the above, data can be securely transported between devices through utilization of the CHMI 500. For instance, if it is desirable to install substantially similar software on multiple CHMIs, the software can be placed on the flash memory card 100 through utilization of the analysis component 306. The flash memory card 100 can then be removed from the CHMI 500 and placed within another device that can interface with the flash memory card 100. The software can then be installed on such device (if other access rights are granted). However, the data on the flash memory card 100 cannot be widely disseminated (e.g., over the Internet), as such data is tied to the card 100.

Figure 6:
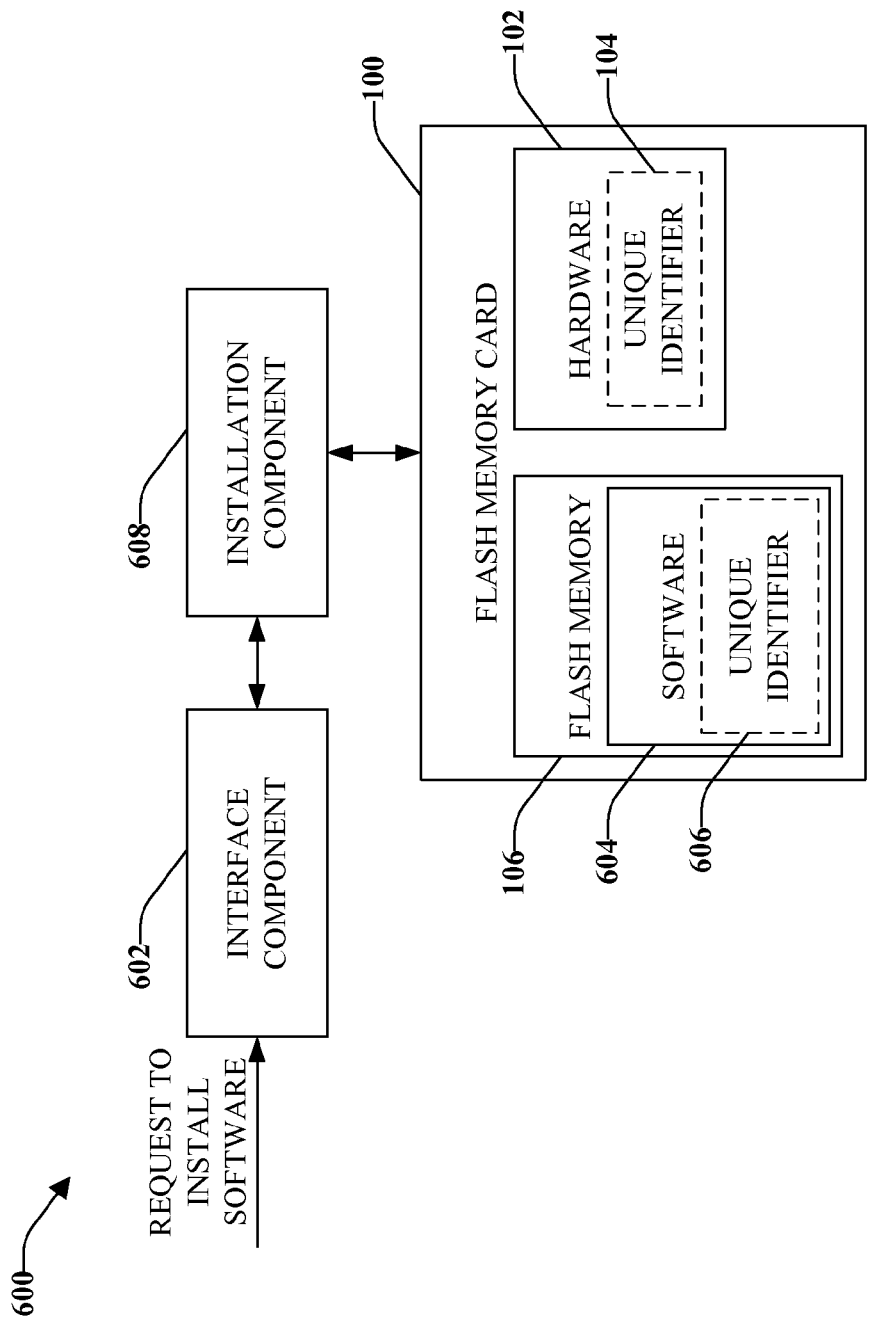
FIG. 6 is a system for accessing data that is retained on a flash memory card, wherein the data is tied to the flash memory card.

With reference to FIG. 6, a system 600 for installing software on a computing device (and/or transferring data to a computing device) is illustrated. The system 600 includes an interface component 602 that receives a request to install software on a computing device that is coupled to the flash memory card 100. For example, a user can access contents of the flash memory card 100 by selecting a drive that is associated with the flash memory card 100. Additionally, the flash memory card 100 includes the flash memory 106, which is utilized to retain software 604 that is the subject of the request. The software 604 is associated with a unique identifier 606 that corresponds to the unique identifier 104 that is permanently embedded within the hardware 102 (and thus cannot be programmatically altered). As described above, the unique identifier 606 corresponds to the unique identifier 104, such that the unique identifier 606 can be a copy of the unique identifier 104, an encrypted version of the unique identifier 104, a hash of the unique identifier 104, and/or the like.

The request to install the software 604 is relayed to an installation component 608, which can perform an analysis with respect to the unique identifier 606 and the unique identifier 104. For instance, the installation component 608 can determine if the unique identifier 606 and the unique identifier 104 match. If the unique identifier 606 and the unique identifier 104 do not correspond, then the installation component 608 can refuse to install the software. If the unique identifier 606 and the unique identifier 104 do correspond, then the installation component 608 can proceed with installing the software 604 on the aforementioned computing device.

While described in connection with installation of software, it is to be understood that the installation component 608 can determine whether to transfer data within the flash memory 106 to a different data repository. For example, if data within the flash memory 106 is associated with a unique identifier that does not correspond to the unique identifier 104, then the installation component 608 can prohibit such data from being extracted from the flash memory card 100. Similarly, the installation component 608 can prohibit data on the flash memory card 100 from being viewed and/or executed if a unique identifier associated therewith does not correspond to the unique identifier 104. Therefore, data (including software) can be tied to the flash memory card 100, and widespread dissemination of such data can be prohibited.

Figure 7:
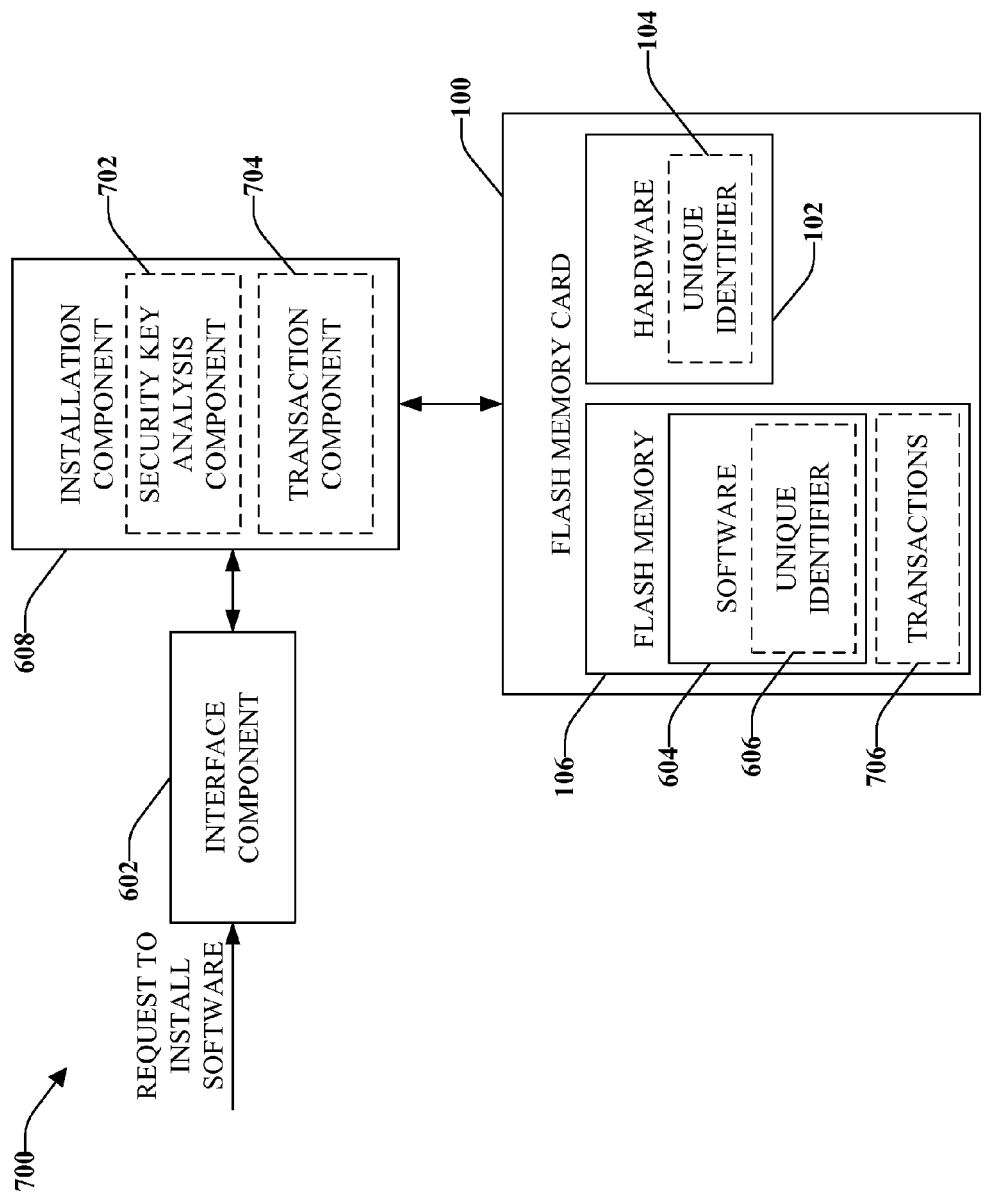
FIG. 7 is a system for accessing data that is retained on a flash memory card, wherein the data is tied to the flash memory card.

Now turning to FIG. 7, a system 700 that facilitates installation of software, transfer of data, and/or execution of data is illustrated. The system 700 can reside within a computing device, and includes the interface component 602, which can receive the request to install software, transfer data, and/or execute data, wherein the software 604 (or other suitable data) that is the subject of the request is resident within the flash memory 106 of the flash memory card 100. The installation component 608 can receive the request and compare the unique identifier 606 that is associated with the software 604 with the unique identifier 104 that is permanently embedded within the hardware 102. If the unique identifiers 606 and 104 do not correspond, then the installation component 608 can prohibit installation of the software 604 (and transfer or execution of data).

The installation component 608 can additionally include a security key analysis component 702, which can be utilized to enforce one or more security keys with respect to the software 604. For instance, once the installation component 608 has verified that the unique identifiers 606 and 104 correspond, the installation component 608 can prompt a user for security keys that enable the software 604 to be installed. Pursuant to an example, the security key can be an alphanumerical code that should be known by a purchaser of the software 604. If the security keys provided by the user do not correspond with security keys within the flash memory card 100, then the installation component 608 can prohibit the software 604 from being installed (or data being transferred/executed).

Additionally, the installation component 608 can include a transaction component 704, which can association transactions (e.g., installations) with the unique identifier 104. For instance, it may be desirable to restrict a number of installations of the software 604; therefore, each time the software 604 is installed the transaction component 704 can record such transaction(s) 706 within the flash memory 106 and associate the transaction(s) 706 with a unique identifier that corresponds to the unique identifier 104. Other transactions besides installation can also be recorded within the flash memory 106, such as number of times data has been executed, transferred, accessed, and/or the like. When the installation component 608 is preparing to install the software 604, the transaction component 704 can analyze the transactions 706 within the flash memory 106 and make a determination regarding whether installation should be initiated (e.g., whether a limit of transactions has been exceeded). Moreover, the installation component 608 can decrypt data, utilize hash algorithms with respect to the unique identifier 606, and the like.

Figure 8:
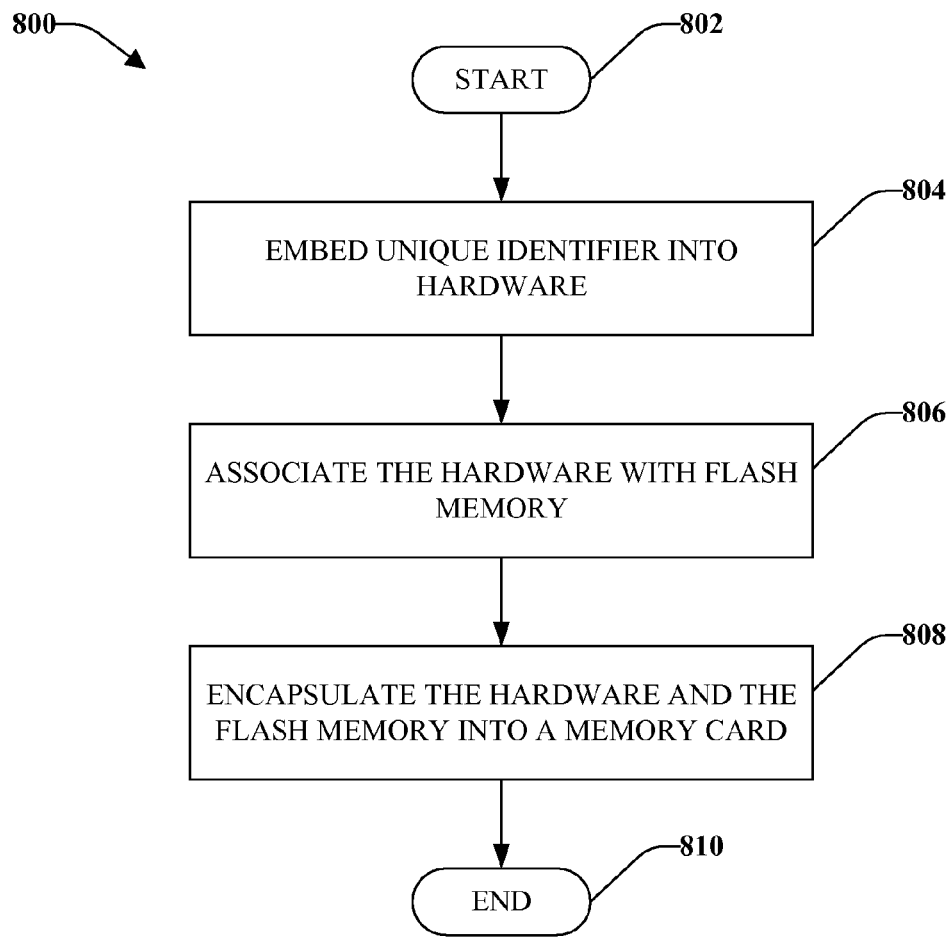
FIG. 8 is a representative flow diagram that illustrates a methodology for permanently embedding a unique identifier within a flash memory card.
Figure 9:
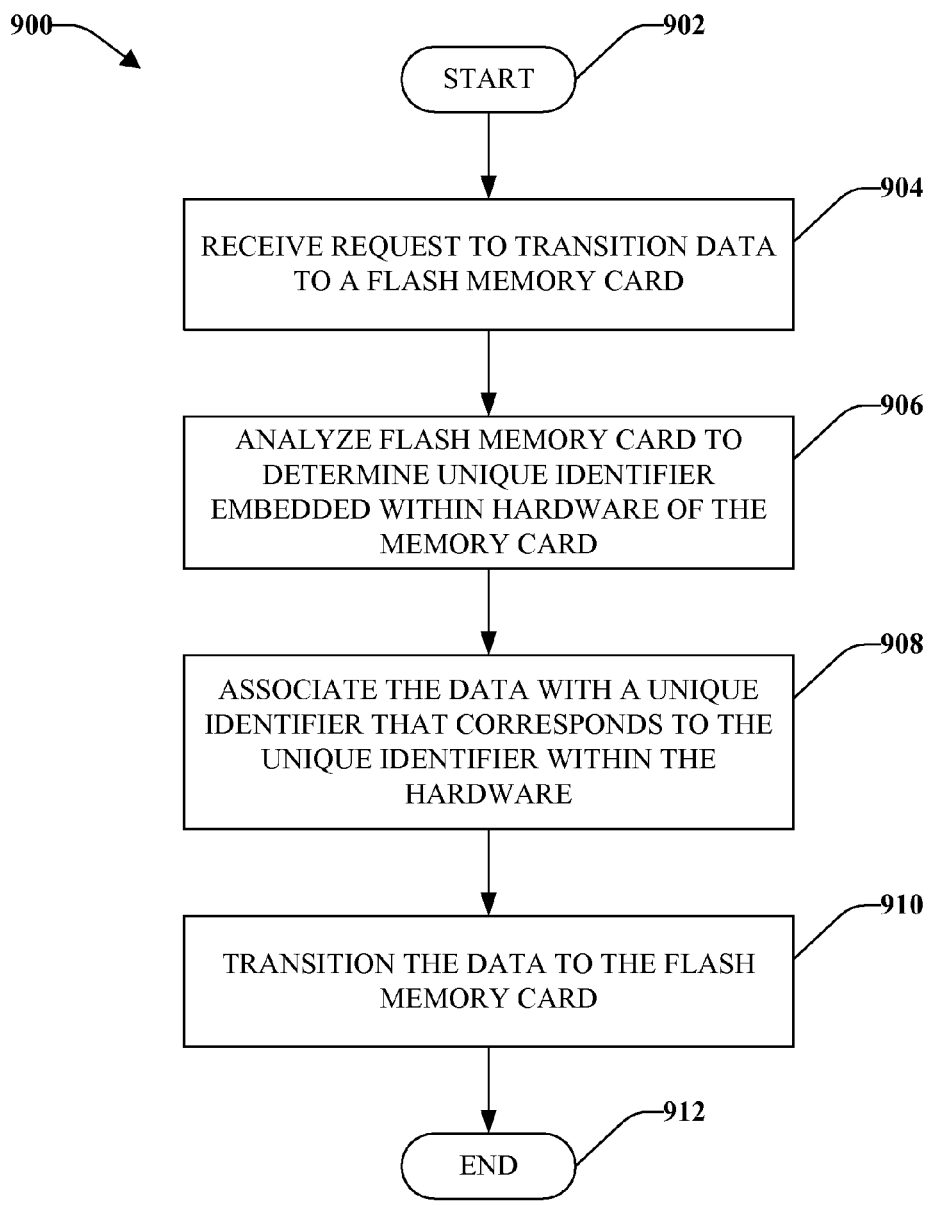
FIG. 9 is a representative flow diagram that illustrates a methodology for transitioning sensitive data to a flash memory card and tying such data to the flash memory card.
Figure 10:
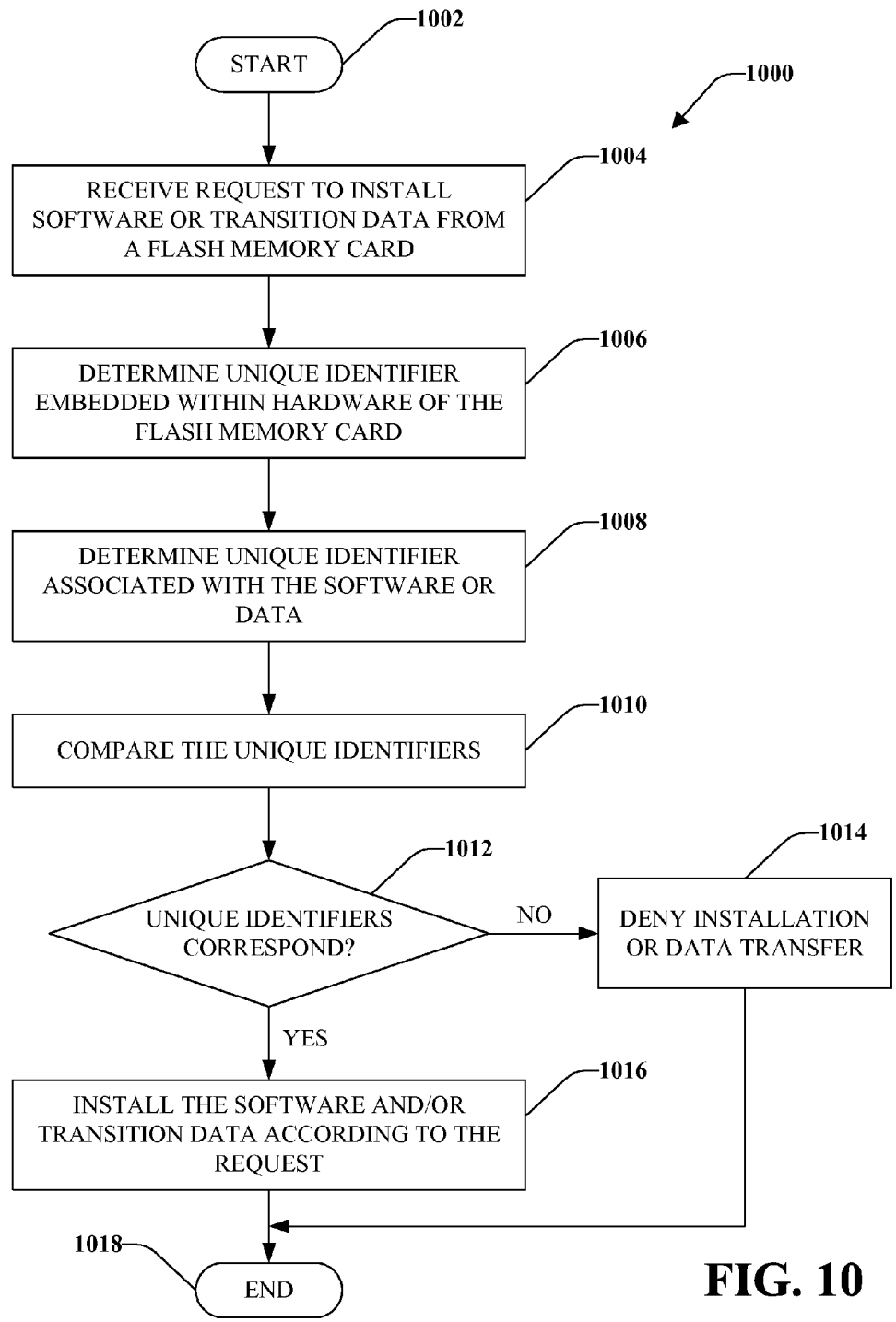
FIG. 10 is a representative flow diagram that illustrates a methodology for accessing sensitive data that is resident upon a flash memory card.

Turning to FIGS. 8-10, several methodologies are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring specifically to FIG. 8, a methodology 800 for embedding a unique identifier, such as a serial number, into a flash memory card is illustrated. The methodology 800 starts at 802, and at 804 a unique identifier is permanently embedded into a piece of hardware, such that the unique identifier cannot be programmatically altered. For example, the unique identifier can be a serial number or any other suitable alphanumerical sequence that can uniquely identify a device. At 806, the hardware is associated with flash memory, such as electronically coupled to the flash memory, placed upon a substantially similar backing as the flash memory, and/or the like.

At 808, the hardware and the associated flash memory are encapsulated together such as to create a flash memory card with a unique identifier embedded into the hardware thereof. For instance, the flash memory card can be accessed and the unique identifier can be ascertained. Additionally, data files, executables, software, and/or the like can be retained upon the flash memory card. The methodology 800 then completes at 810.

With reference now to FIG. 9, a methodology 900 for transitioning data (including software) into a flash memory card is illustrated. For example, an industrial control device, such as a CHMI, can be configured to perform the methodology 900. The methodology 900 starts at 902, and at 904 a request to transition data from a storage medium to a flash memory card is received. For instance, the request can be programmatically received, received from an individual, and/or the like. At 906, the flash memory card is analyzed to determine a unique identifier that is embedded within hardware of the flash memory card. As described above, the unique identifier can be a serial number, and can be permanently embedded (such that it cannot be programmatically altered).

At 908, the data that is desirably transferred to the flash memory card is associated with the unique identifier. For instance, the unique identifier can be copied and placed within a header associated with the data. In another example, the unique identifier can be determined, and a copy thereof can be encrypted or subject to a hashing algorithm, and the encrypted version (or hashed version) of the unique identifier can be associated with the data. Still further, other rules, such as a number of times the data can be accessed, a number of times software can be installed, a time window that the data can be accessed, and other suitable rules can be associated with the data. At 910, the data (and associated unique identifier) is transitioned to the flash memory card. Thus, the data is effectively tied to the flash memory card. The methodology 900 then completes at 912.

Now turning to FIG. 10, a methodology 1000 for accessing or copying data from a flash memory card and/or installing software that is resident upon the flash memory card is illustrated. For instance, an industrial automation device, such as a logic controller or a CHMI can be configured to perform the methodology 1000. The methodology 1000 starts at 1002, and at 1004 a request to install software, access data, and/or transition data from the flash memory card to another data storage medium is received. For instance, a user can employ an operating system to access contents of the flash memory card and then select data therein, select an executable, and/or the like. At 1006, a unique identifier that is permanently embedded within hardware of the flash memory card is determined. Pursuant to an example, the hardware can be scanned to determine the unique identifier that is permanently embedded therein.

At 1008, a unique identifier that is associated with the software or data that is the subject of the request is determined, wherein determining such identifier can include acts of decrypting a unique identifier, utilizing hash algorithms against a unique identifier, and/or the like. As described above, the unique identifier can be placed within a header packet of data that resides within the flash memory card. At 1010, the unique identifier that is embedded within the hardware of the flash memory device is compared with the unique identifier that is associated with the software or data.

At 1012, a determination is made regarding whether the unique identifiers correspond to one another. For instance, a determination can be made regarding whether the unique identifiers match. If the unique identifiers do not correspond, then installation of software, access of data, and/or copying of data is denied at 1014. If the unique identifiers do correspond, then the software can be installed and/or data can be transitioned according to the request at 1016. The methodology 1000 then completes at 1018.

Figure 11:
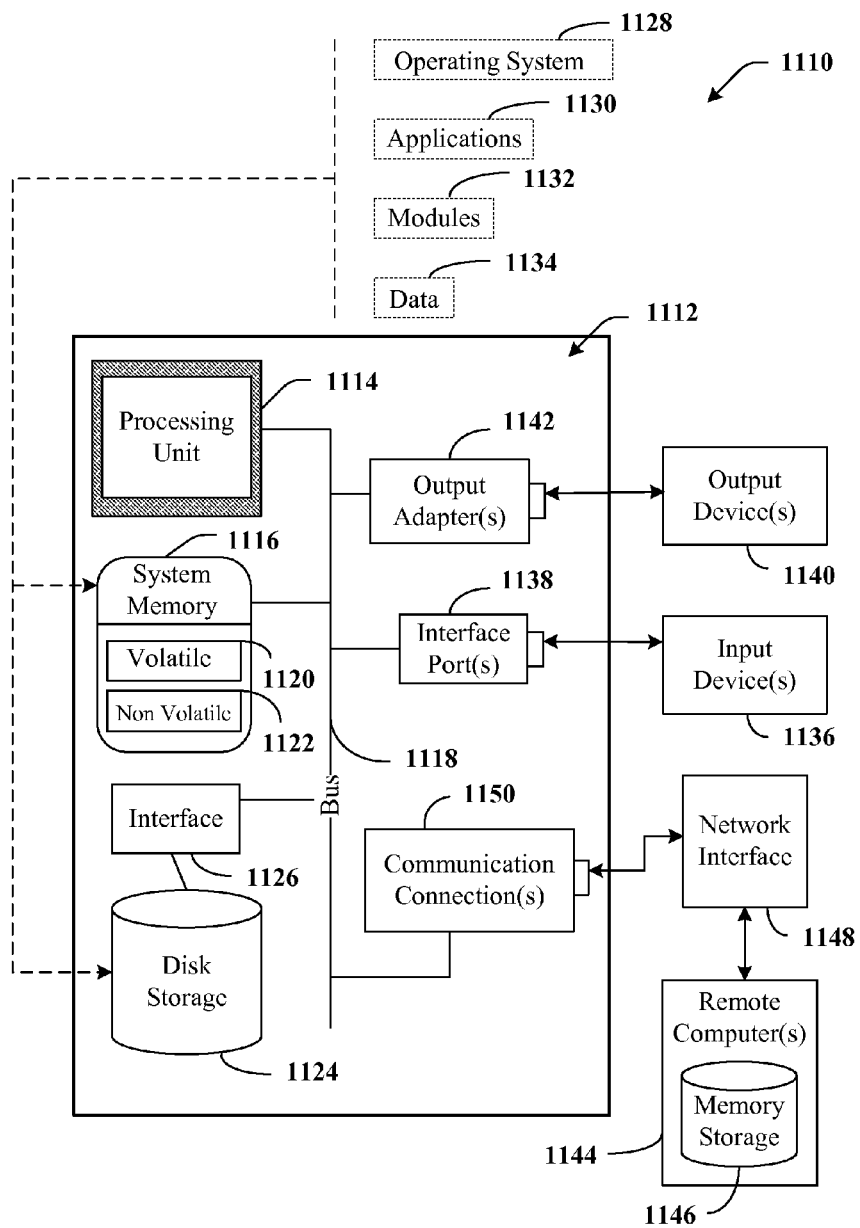
FIG. 11 is an example computing environment.

With reference to FIG. 11, an example environment 1110 for implementing various aspects of the claimed subject matter, including tying data/software to a flash memory card, includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable PROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
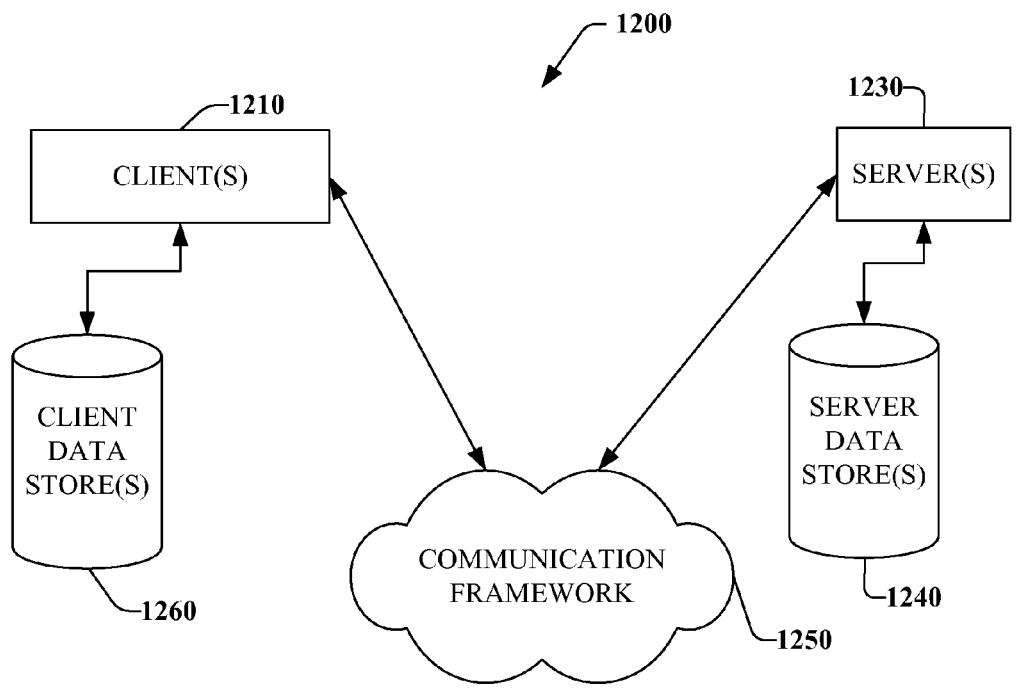
FIG. 12 is an example networking environment.

FIG. 12 is a schematic block diagram of a sample-computing environment 1200 with which the subject invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the subject invention, for example. One possible communication between a client 1210 and a server 1230 can be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for secure data transfer in an industrial automation environment, comprising:
   receiving, from a portable electronic device, software and a corresponding identifier relating to a unique identifier of the portable electronic device;
   installing the software on a industrial automation device;
   storing the corresponding identifier in the industrial automation device; and
   employing, subsequent to the storing, the corresponding identifier to prohibit a transfer of the software from the industrial automation device without utilizing the portable electronic device, wherein the employing includes comparing the corresponding identifier to an identifier of the industrial automation device.

2. The method of claim 1, further comprising, comparing the corresponding identifier with the unique identifier prior to the installing.

3. The method of claim 1, further comprising, receiving a request to install the software onto the industrial automation device that is communicatively coupled to the portable electronic device.

4. The method of claim 1, further comprising, requesting a first security key to be input at the industrial automation device, prior to the installing.

5. The method of claim 4, further comprising, comparing the first security key with a second security key stored in the portable electronic device to facilitate authentication of the industrial automation device.

6. The method of claim 1, wherein the installing includes installing the software by utilizing a Universal Serial Bus (USB) protocol.

7. The method of claim 1, wherein the installing includes installing the software based in part on a rule that is stored on the portable electronic device and is associated with access of the software.

8. The method of claim 1, wherein the installing includes installing the software based in part on an instruction that allows installation the software for a specified time period.

9. The method of claim 1, wherein the installing includes installing the software based in part on an instruction that allows installation the software by one or more specified entities.

10. An industrial automation device, comprising:
    at least one processor configured to execute computer executable components stored on at least one non-transitory computer readable storage medium, the computer executable components, comprising:
       an interface component that receives a request for an installation of software residing on a portable electronic device coupled to the industrial automation device; and
       an installation component that receives the software and a corresponding identifier linked to the software from the portable electronic device, wherein the corresponding identifier is related to a unique identifier of the portable electronic device,
    wherein, after the software and the corresponding identifier are stored on the industrial automation device, a disparate installation of the software without utilizing the portable electronic device is prohibited, based on a comparison of the corresponding identifier with a unique identifier of the industrial automation device.

11. The industrial automation device of claim 10, further comprising, an analysis component that authorizes the installation on the industrial automation device, based on a comparison of a user-specified security key with a security key programmed within the portable electronic device.

12. The industrial automation device of claim 11, wherein the analysis component authorizes the installation on the industrial automation device based on a comparison of the corresponding identifier and the unique identifier.

13. The industrial automation device of claim 10, further comprising, a transaction component that updates an installation count, in response to the software being installed on the industrial automation device, and associates the installation count with the corresponding identifier.

14. The industrial automation device of claim 10, wherein the installation component permits the installation of the software only upon a linking of the corresponding identifier and the unique identifier.

15. The industrial automation device of claim 10, further comprising a Universal Serial Bus (USB) port that couples the portable electronic device to the industrial automation device.

16. The industrial automation device of claim 10, wherein the installation component permits the installation of the software based in part on a rule that is stored on the portable electronic device and is associated with access of data associated with the software.

17. The industrial automation device of claim 16, wherein the rule includes an instruction to deny access to the data from the portable device, after a specified time period.

18. The industrial automation device of claim 16, wherein the rule includes an instruction to prohibit one or more specified entities access to the data from the portable device.

19. The industrial automation device of claim 16, wherein the portable device includes a memory card.

* * * * *